United States Patent [19]

Byrns

[11] 4,036,616
[45] July 19, 1977

[54] BACTERIA FILTER AND METHOD OF ASSEMBLING SAME

[75] Inventor: John Byrns, Los Angeles, Calif.

[73] Assignee: Robert A. Baker, Santa Barbara, Calif. ; a part interest

[21] Appl. No.: 465,734

[22] Filed: May 1, 1974

[51] Int. Cl.² .............................................. B01D 46/10
[52] U.S. Cl. ........................................ 55/498; 55/514;
210/493 B; 156/69
[58] Field of Search ................ 55/498, 501, 502, 511, 55/514, 503, 504, 510, 521; 210/493, 446, 451; 156/293, 294, 69

[56] References Cited

U.S. PATENT DOCUMENTS

| 3,002,870 | 10/1961 | Belgarde et al. | 55/498 |
| 3,708,965 | 1/1973 | Domnick | 55/498 |
| 3,772,857 | 11/1973 | Jackson et al. | 55/503 |
| 3,785,129 | 1/1974 | Szmatko | 55/498 |
| 3,815,754 | 6/1974 | Rosenberg | 55/514 |

FOREIGN PATENT DOCUMENTS 2,213,874  10/1973  Germany .............................. 210/493

*Primary Examiner*—Bernard Nozick
*Attorney, Agent, or Firm*—Burton & Dorr

[57] ABSTRACT

A bacteria filter has a base member with an open circular groove in which an adhesive bonding material anchors one end of a generally cylindrical filter element. The filter element has longitudinally extending pleats and the opposite end of the filter is adhesively secured in an open circular channel in an end cap element opposing the base member. A housing for the filter is sealed to the base member in spaced surrounding relationship with the filter element and has an inlet passage therethrough whereby air may enter the filter device through the inlet passage, flow through the filter element, and be emitted through the outlet passage in the base member. The method of assembling the filter device includes a unique method of retaining the pleated filter element in the desired cylindrical form while bonding the filter element to the base member and/or end cap.

6 Claims, 6 Drawing Figures

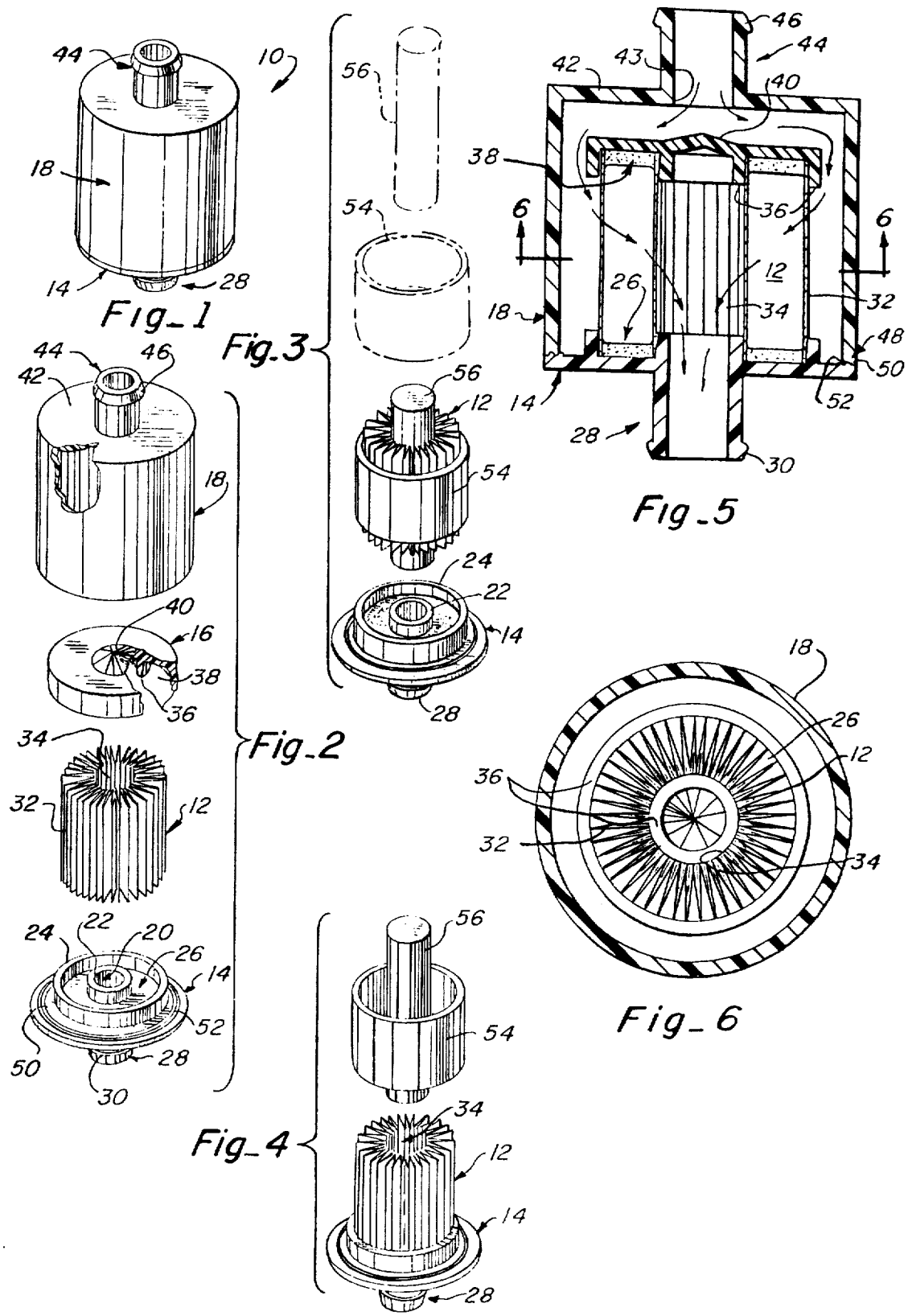

BACTERIA FILTER AND METHOD OF ASSEMBLING SAME

BACKGROUND OF THE INVENTION

1. Field of the Invention

The present invention relates generally to filter devices and more particularly to a new and improved bacteria filter device designed to effectively filter bacterial matter from fluids passing therethrough while rigidifying a pleated cylindrical filter element. The invention further relates to the method of assembling the filter device so that the cylindrical pleated filter element is retained in the desired form during assembly of the filter device.

2. Description of the Prior Art

In certain artificial respiratory systems, such as intermittent positive pressure breathing systems (IPPB), used in assisting asthma patients with breathing, air purifiers or bacteria filters are used to remove undesirable bacteria from the fluid sprayed into the patient's mouth. A typical IPPB system has a nebulizer nozzle designed to cooperate with a nebulizer filter in spraying the desired fluid into the patient's mouth. A typical IPPB system also includes a main line filter having a greater capacity for purifying the main line air flow. Filters which have been found desirable in obtaining high capacity filtration while being compact in size have utilized a pleated generally cylindrical filter element, but while these filter elements give the optimum in filtering capacity for a designated filter size, they have length limitations since physical strength of the element diminishes with the length and long filter elements may collapse in use reducing the efficiency and reliability of the filter device. Further, pleated filters of the aforedescribed type have previously been difficult to position and retain within the filter device with the pleats uniformly spaced in a circular array.

SUMMARY OF THE INVENTION

It is an object of the present invention to provide a new and improved filter device offering optimum filtering capacity in a compact unit.

It is another object of the present invention to provide a new and improved compact filter device incorporating means for rigidifying an elongated pleated filter element while thoroughly sealing the filter element within the filter device.

It is another object of the present invention to provide a new and improved filter device comprised of four component parts which are directly interrelated and connected to establish a leak-proof filter device with optimum filtering capacity for a designated unit size.

It is another object of the present invention to provide a new and improved method of assembling a filter device wherein a generally cylindrical pleated filter element is confined to a desired size and orientation during assembly to obtain optimum filtering capacity in the assembled filter device.

These and other objects of the present invention are obtained with a simplified and compact filter device wherein a rigidified filter element provides a long useful life for the device.

More particularly, the filter device has a base member with a centrally located outlet passage and an open circular channel surrounding the passage on one side of the base element. The open circular channel is adapted to receive a charge of adhesive material so that one end of a generally cylindrical pleated filter element can be positively sealed in the open groove. The opposite end of the filter element is adhesively sealed in a similar open channel provided in an end cap element. In the preferred form of the invention, the filter element is imbedded in the bonding medium an aggregate depth of approximately 5 to 10% of the overall length of the filter element so that the element is rigidified along a substantial portion of its length while leaving an optimum exposed area for filtering purposes.

A generally cylindrical housing member is sealed to the base member in spaced surrounding relationship with the filter element so that fluid entering the filter element through an inlet passage in one end of the housing member will be dispersed by a deflector on the end cap and be uniformly passed through the filter element before being emitted through the outlet passage in the base member.

The method of assembling the filter device includes the steps of inserting the pleated filter element in a generally cylindrical assembly sleeve which confines the filter element to a predetermined diameter and inserting a cylindrical assembly rod into the hollow center of the filter element so that the pleats in the filter element are uniformly spaced throughout 360°. With the filter element so confined, it is inserted into one of the open channels in the base member or the end cap after a charge of adhesive has been placed in the appropriate channel so that the desired configuration of the filter element and spacing between the pleats in the filter element are obtained. After the adhesive has cured to a point where it retains the spacing of the pleats, the cylindrical rod and sleeve are removed so that the opposite end of the filter can be adhesively sealed in the open channel of the other of the base member or end cap. Finally, the housing member is sonically welded to the base member establishing a leak-proof filter device with optimum filtering capacity for a designated unit size.

Other objects, advantages and capabilities of the present invention will become more apparent as the description proceeds taken in conjunction with the accompanying drawings.

BRIEF DESCRIPTION OF THE DRAWINGS

FIG. 1 is a perspective view of the assembled filter device of the present invention, FIG. 2 is an exploded perspective view of the filter device of the present invention with parts broken away for clarity, FIGS. 3 and 4 are operational views illustrating the method of assembly of the filter device of FIG. 1, FIG. 5 is an enlarged vertical section taken through the filter device of FIG. 1, and FIG. 6 is a horizontal section taken along line 6—6 of FIG. 5.

DESCRIPTION OF THE PREFERRED EMBODIMENT

Referring first to FIG. 2, it will be seen that the filter device 10 of the present invention is composed of four parts which are assembled into the compact filter unit illustrated in FIG. 1. The four component parts include a filter element 12, a base member 14, an end cap 16, and housing member 18, and the parts are integrally united in a manner to be described hereinafter to establish a durable leak-proof filter device with optimum filtering capacity for a designated unit size.

The base member 14, as probably best seen in FIGS. 2 and 5, is a disk-like member of circular configuration with a circular opening 20 therein along its central longitudinal axis. Inner and outer concentric raised ribs 22 and 24 respectively, project upwardly from the upper surface of the base element 14 in circumscribing relationship to the opening 20. The inner circular rib 22 has an inner diameter equivalent to the diameter of the opening 20 and the inner and outer concentric ribs 22 and 24 respectively, cooperate in defining an open circular channel 26 surrounding the opening. A rigid hollow tubular neck 28 projects downwardly from the lower surface of the base member 14 and is concentric with the opening 20 in the base member to establish an outlet passage of the filter device. As is conventional, the lower end 30 of the tubular neck 28 is frusto-conical in configuration, as is best illustrated in FIG. 5, to facilitate positive but releasable connection of a flexible air flow tube (not shown) thereto.

The filter element 12 which is adapted to be seated in the open channel 26 of the base element 14 can be seen to be of generally cylindrical configuration with the pleats 32 extending longitudinally in parallel relationship and being of a depth substantially equal to the width of the open channel 26. The innermost radial extent of the pleats 32 are spaced from each other defining a hollow cylindrical core 34 of the filter element. As will be explained more clearly later, the filter element is sealed in the open channel of the base member in a manner such that the pleats are uniformly spaced circumferentially to obtain optimum filtering capacity.

The end cap 16, as best seen in FIGS. 2 and 5, is also of circular disk-like configuration and has a pair of concentric circular depending ribs 36 from its lower surface which cooperate in defining an open circular channel 38 adapted to receive the upper end of the filter element 12. As with the width of the open channel 26, the width of the open channel 38 in the end cap is substantially equal to the depth of the pleats in the filter element 12. A conical deflector 40 is centrally located on the upper surface of the end cap 16 and is raised relative to the top of the end cap so as to desirably deflect and disperse fluids entering the filter element 12 as will be explained more fully later. The diameter of the end cap 16 is smaller than the diameter of the base member 14 to allow desired air flow through the filter device which will become more apparent with the description of the housing member hereinafter.

The housing member 18, as best seen in FIGS. 2 and 5, is of cylindrical configuration having an end wall 42 at its upper end and an open lower end. A centrally located opening 43 equivalent in size to the opening 20 in the base member 14, is provided in the end wall 42 and cooperates with a concentric rigid hollow tubular neck 44 protruding upwardly therefrom in defining the inlet passage of the filter device. As with the tubular neck 28 on the base member 14, the tubular neck 44 on the housing member 18 has a frusto-conical distal end 46 establishing means for positively but releasably connecting a flexible air flow tube (not shown) to the filter device. The housing member has a diameter equivalent to that of the base member 14 and the lower peripheral edge of the housing member 18 is provided with an annular groove 48, FIG. 5, to mate with a raised outer circumferential ridge 50 on the periphery of the base member. The ridge 50 and groove 48 cooperate in quickly aligning the housing member 18 with the base member 14 during assembly of the device. To further facilitate alignment, a second inner raised circumferential ridge 52 is provided on the base member to engage the inner wall of the housing member around its lower periphery. Accordingly, during assembly of the device, the housing member 18 can be quickly positioned relative to the base member 14 by inserting the housing member downwardly over the filter element 12 and end cap 16 so that the circumferential ridges 50 and 52 on the base member cooperate with the annular groove 48 and lower periphery of the housing member as illustrated in FIG. 5.

As will be appreciated from the following description of the method of assembling the filter device from the four component parts previously described, the parts are integrally interconnected in a simplified leak-proof manner so that the device is reliable over a long operative life. One of the critical features in properly assembling the filter device is positioning the filter element 12 within the device so that the pleats 32 are substantially uniformly spaced in a circular array and so that the maximum surface area of the filter element 12 is exposed. Further, as will be readily understood by those skilled in the art, the greater the length of the filter element, the more difficult it is for the filter element to be self-standing; that is, retain the rigidity along its length necessary to prevent collapsing when pressure is applied to one end of the filter element.

Accordingly, referring to FIGS. 3 and 4, in accordance with the method of assembly of the present invention, the filter element 12 is placed into a cylindrical assembly sleeve 54 so that the outer diameter of the filter element is the same as the inner diameter of the sleeve and a cylindrical assembly rod 56 is inserted through the hollow core 34 of the filter element 12 so that the pleats 32 in the filter element radiate outwardly from the assembly rod 56 and terminate in engagement with the inner wall of the assembly sleeve 54. The uniform spacing of the pleats 32 can be readily checked with the assembly rod 56 and sleeve 54 on the filter element by making sure that the pleats extend in a radial direction and are each spaced uniformly from adjacent pleats. After the filter element 12 has been desirably oriented with the assembly rod and sleeve, a charge of adhesive is placed in the open circular channel 26 in the base member 14. Next, the lower end of the filter element is inserted into the adhesive charge in the open channel 26 by axially advancing the filter element with the assembly rod 56 and sleeve 54 thereon toward the base member 14 until the assembly sleeve 54 engages the upper edge of the outer circular rim on the base member. At this point, the filter element 12 can be axially slid along the assembly sleeve and rod by finger tip pressure and thereby pressed into the adhesive so that it is securely and uniformly embedded therein. Once the filter element has become positively positioned in the adhesive, the assembly rod and sleeve are removed from the filter element. Next, a charge of adhesive is placed in the circular open channel 38, FIG. 2, of the end cap 16 and the upper unattached end of the filter element 12 is inserted into the adhesive in the open channel of the end cap with the end cap inverted. The assembly rod 56 and sleeve 54 are not necessary for this step of assembly since the filter element is retained in its desired orientation by the adhesive in the base member 14. It will be appreciated that the order of adhesively bonding the filter element 12 to the base member 14 and end cap 16 can be reversed since the rod and sleeve assembly devices work equally well in cooperation with the end cap and the base member.

After the ends of the filter element 12 have been desirably bonded to and sealed in the base member 14 and end cap 16, the housing member 18 is placed over the filter element so that the groove 48 in its lower edge mates with the outer raised ridge 50 on the base member for proper alignment and then the housing member and base member are sonically welded together in a conventional manner to effect a leak-proof hermetic seal between the housing and base members.

It is important that the adhesive used to bond the filter element 12 to the base member 14 and the end cap 16 effects a leak-proof seal between the respective elements so that all air flowing through the filter device 10 is forced to pass through the exposed surfaces of the filter element 12. An example of an adhesive found desirable for bonding the filter element to the base member and end cap is Jet Melt Adhesive 3738 marketed by 3M Company of St. Paul, Minn. This adhesive has good impact resistance, a tensile strength of approximately 360 PSI, and readily cures in about 50 seconds for quick assembly of the filter device.

It is desirable when assembling the device that the depth of the adhesive in the open channel be sufficient to extend along a substantial portion of the length of the filter element to rigidify the filter element 12 along its length thereby minimizing possible collapse of the filter element. It has been found that when a typical paper filter element is embedded in the adhesive an aggregate amount of approximately 5 to 10% of its overall length, that the filter element is adequately rigidified along its length to withstand relatively large fluid pressures. In other words, if the adhesive at each end of the filter element covers approximately 2½ to 5% of the overall length of the filter element, a typical paper filter has been found to be adequately rigidified.

The operation of the filter device is best illustrated in FIG. 5 wherein it can be seen that air enters the device 10 through the inlet passage at the top of the housing member and is deflected by the conical deflector 40 uniformly in radial directions so that the air flows around the end cap 16, through the space between the end cap and the housing member 18 and then flows inwardly through the exposed surfaces of the filter element 12 into the core 34 of the filter element before being emitted through the outlet 20 in the base member. As mentioned previously, since the pleats 32 in the filter element are uniformly spaced in a circular array, the surface area of the pleated filter element 12 is maximized for optimum filtering capacity.

A filter device constructed in accordance with the present invention and utilizing a conventional paper filter with the aforedescribed 3M adhesive was found to withstand 2 PSI internal pressure and allow penetration of only three bacterial particles out of 10,000 at a 10 liters per minute air flow rate. In other words, a filter device with the above characteristics was found to have an efficiency of 99.97 percent in collecting and retaining bacterial particles.

Although the present invention has been described with a certain degree of particularity, it is understood that the present disclosure has been made by way of example and that changes in details of structure may be made without departing from the spirit thereof.

What is claimed is:

1. A filter device comprising in combination:

a base member substantially of circular disk configuration with a central opening therethrough, a pair of raised concentric circular rims surrounding said opening on one face of the base member defining a continuous open circular channel, a hollow tubular neck co-axial with said opening protruding away from the other face of the element defining an outlet passage of the filter device, a generally cylindrical filter element with longitudinally extending pleats surrounding a hollow core of the filter element, a first charge of adhesive material sealing one end of the filter element in the circular channel of the base member, an end cap substantially of circular disk configuration overlying and covering the other end of said filter, said end cap further having a pair of raised concentric circular rims on one face thereof defining a raised continuous open circular channel, said end cap having a centrally located conical deflector on its other face, a second charge of adhesive material sealing the opposite end of the filter element in the continuous open circular channel of the end cap, a hollow generally cylindrical housing member having one open end and an end wall at the opposite end, the open end of said housing member being circumferentially sealed to the outer periphery of said base member, said housing member being disposed in spaced surrounding concentric relationship with the filter element and having its end wall spaced apart from and in substantially parallel relationship with said end cap, the end wall of said housing member having a centrally located opening therethrough in axial alignment with the conical deflector on the end cap, and a hollow tubular neck co-axial with said opening in the end wall defining an inlet passage of the filter device whereby fluid flowing into the device through the inlet passage will be dispersed radially by the conical deflector on the end cap and thereby flow radially inwardly through the filter element before being emitted through the outlet passage in the base member.

2. A filter device comprising in combination:

a base member substantially of circular disk configuration with a central opening therethrough, a pair of raised concentric circular rims surrounding said opening on one face of the said base member defining a continuous open circular channel, a hollow tubular neck co-axial with said opening protruding away from the other face of the element defining an outlet passage of the filter device, a generally cylindrical filter element with longitudinally extending pleats surrounding a hollow core of the filter element, a first charge of adhesive material sealing one end of the filter element in the circular channel of the base member, an end cap substantially of circular disk configuration overlying and covering the other end of said filter, said end cap further having a pair of raised concentric circular rims on one face thereof defining a continuous open circular channel, said end cap having a raised centrally located conical deflector on its other face, a second charge of adhesive material sealing the opposite end of the filter element in the continuous open circular channel of the end cap, wherein the adhesive material bonding the filter element to the base member and to the end cap extends in aggregate 5 to 10% of the overall distance between the ends of the filter element, a hollow generally cylindrical housing member having one open end and an end wall at the opposite end, the open end of said housing member being circumferentially sealed to the outer periphery of said base member, said housing member being disposed in spaced apart surrounding concentric relationship with the filter element and having its end wall spaced from and in substantially parallel relationship with said end cap, the end wall of said housing member having a centrally located opening therethrough in axial alignment with the conical deflector on the end cap, and a hollow tubular neck co-axial with said opening in the end wall defining an inlet passage of the filter device whereby fluid flowing into the device through the inlet passage will be dispersed radially by the conical deflector on the end cap and thereby flow radially inwardly through the filter element before being emitted through the outlet passage in the base member.

3. A filter device comprising in combination:

a base member substantially of circular disk configuration with a central opening therethrough, a pair of raised concentric circular rims surrounding said opening on one face of the base member defining a continuous open circular channel, a hollow tubular neck co-axial with said opening protruding away from the other face of the element defining an outlet passage of the filter device, a generally cylindrical filter element with longitudinally extending pleats surrounding a hollow core of the filter element, a first change of adhesive material sealing one end of the filter element in the circular channel of the base member, an end cap substantially of circular disk configuration overlying and covering the other end of said filter, said end cap further having a pair of raised concentric circular rims on one face thereof defining a continuous open circular channel, said end cap having a raised centrally located conical deflector on its other face, a second charge of adhesive material sealing the opposite end of the filter element in the continuous open circular channel of the end cap wherein the adhesive material bonding the ends of the filter element to the base member and to the end cap extends in aggregate 5 to 10% of the overall length of the filter element, a hollow generally cylindrical housing member having one open end and an end wall at the opposite end, the open end of said housing member being circumferentially sealed to the outer periphery of said base member, said housing member being disposed in spaced apart surrounding concentric relationship with the filter element and having its end wall spaced from and in substantially parallel relationship with said end cap, the end wall of said housing member having a centrally located opening therethrough in axial alignment with the conical deflector on the end cap, and a hollow tubular neck co-axial with said opening in the end wall defining an inlet passage of the filter device whereby fluid flowing into the device through the inlet passage will be dispersed radially by the conical deflector on the end cap and thereby flow radially inwardly through the filter element before being emitted through the outlet passage in the base member.

4. A filter device comprising in combination:

a base member substantially of circular disk configuration with a central opening therethrough, a pair of raised concentric circular rims surrounding said opening on one face of the base member defining a continuous open circular channel, a hollow tubular neck co-axial with said opening protruding away from the other face of the element defining an outlet passage of the filter device, a generally cylindrical filter element with longitudinally extending pleats surrounding a hollow core of the filter element, a first charge of adhesive material sealing one end of the filter element in the circular channel of the base member, an end cap substantially of circular disk configuration overlying and covering the other end of said filter, said end cap further having a pair of raised concentric circular rims on one face thereof defining a continuous open circular channel, said end cap having a raised centrally located conical deflector on its other face, a second charge of adhesive material sealing the opposite end of the filter element in the continuous open circular channel of the end cap, a hollow generally cylindrical housing member having one open end and an end wall at the opposite end, the open end of said housing member being circumferentially sealed to the outer periphery of said base member, said housing member being disposed in spaced apart surrounding concentric relationship with the filter element and having its end wall spaced from and in substantially parallel relationship with said end cap, the end wall of said housing member having a centrally located opening therethrough in axial alignment with the conical deflector on the end cap, and a hollow tubular neck co-axial with said opening in the end wall defining an inlet passage of the filter device whereby fluid flowing into the device through the inlet passage will be dispersed substantially uniformly radially across the conical deflector on the end cap and thereby flow substantially uniformly radially inwardly through all exposed portions of the filter element before being emitted through the outlet passage in the base member.

5. A filter device comprising in combination:

a base member substantially of circular disk configuration with a central opening therethrough, a pair of raised concentric circular rims surrounding said opening on one face of the base member defining a continuous open circular channel, a hollow tubular neck co-axial with said opening protruding away from the other face of the element defining an outlet passage of the filter device, a generally cylindrical filter element with longitudinally extending pleats surrounding a hollow core of the filter element, a first charge of adhesive material sealing one end of the filter element in the circular channel of the base member, an end cap substantially of circular disk configuration overlying and covering the other end of said filter, said end cap further having a pair of raised concentric circular rims on one face thereof defining a continuous open circular channel, said end cap having a raised centrally located conical deflector on its other face, a second charge of adhesive material sealing the opposite end of the filter element in the continuous open circular channel of the end cap, a hollow generally cylindrical housing member having one open end and an end wall at the opposite end, the open end of said housing member being sonically welded to said base member and being circumferentially sealed to the outer periphery of said base member, said housing member being disposed in spaced apart surrounding concentric relationship with the filter element and having its end wall spaced from and in substantially parallel relationship with said end cap, the end wall of said housing member having a centrally located opening therethrough in axial alignment with the conical deflector on the end cap, and a hollow tubular neck co-axial with said opening in the end wall defining an inlet passage of the filter device whereby fluid flowing into the device through the inlet passage will be dispersed substantially uniformly radially across the conical deflector on the end cap and thereby flow substantially uniformly radially inwardly through all exposed portions of the filter element before being emitted through the outlet passage in the base member.

6. A method of assembling a filter device having a base member, a pleated filter element with the pleats extending in parallel longitudinal relationship and cooperating to define a closed loop, an end cap for the filter element and a housing member comprising the steps of:

inserting the filter element into a cylindrical sleeve having an internal diameter equivalent to the desired external diameter of the filter element, inserting a cylindrical rod into the center of the filter element so that it extends parallel to the pleats, applying an adhesive material to said end cap and base element, advancing one end of said filter element against the adhesive on one of said end cap and base member so that the filter element adheres to said one of said end cap and base member and retains the configuration imposed thereon by the cylindrical sleeve and rod, removing the cylindrical sleeve and rod from the filter element, advancing the opposite end of said filter element against the adhesive on the other of said end cap and base member so that the filter element adheres to said other of said end cap and base member, and sealing the housing member to the base member in surrounding relationship with the filter element.

* * * * *